(12) United States Patent
Zhang (10) Patent No.: US 9,800,741 B2
(45) Date of Patent: Oct. 24, 2017

(54) CHARGING METHOD, CHARGING DEVICE, CHARGING SYSTEM, AND AUTHENTICATION DEVICE

(71) Applicant: HUAWEI TECHNOLOGIES CO., LTD., Shenzhen, Guangdong (CN)

(72) Inventor: Yafeng Zhang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 366 days.

(21) Appl. No.: 14/221,306

(22) Filed: Mar. 21, 2014

(65) Prior Publication Data

US 2014/0242941 A1 Aug. 28, 2014

Related U.S. Application Data (63) Continuation of application No. PCT/CN2012/073629, filed on Apr. 9, 2012.

(30) Foreign Application Priority Data

Sep. 26, 2011 (CN) .......................... 2011 1 0288429

(51) Int. Cl.
*H04M 11/00* (2006.01)
*H04M 15/00* (2006.01)
*H04W 4/24* (2009.01)
*H04W 12/06* (2009.01)
*H04L 12/14* (2006.01)

(52) U.S. Cl.
CPC ........ *H04M 15/60* (2013.01); *H04L 12/1403* (2013.01); *H04L 12/1435* (2013.01); *H04L 12/1467* (2013.01); *H04L 12/1485* (2013.01); *H04M 15/85* (2013.01); *H04M 15/851* (2013.01); *H04M 15/854* (2013.01); (Continued)

(58) Field of Classification Search
USPC ................. 455/406, 407, 408, 409, 410, 411
See application file for complete search history.

(56) References Cited

U.S. PATENT DOCUMENTS 7,136,469 B1 11/2006 Ravindranath et al.

FOREIGN PATENT DOCUMENTS

| CN | 1464662 | * 12/2003 |
|---|---|---|
| CN | 101170621 A | 4/2008 |

(Continued)

OTHER PUBLICATIONS

C. Rigney et al; Remote Authentication Dial in User Service (RADIUS); Request for Comments: 2865; Obsoletes: 2138; Network Working Group; Jun. 2000; total 76 pages.

*Primary Examiner* — Lester Kincaid
*Assistant Examiner* — Sayed T Zewari
(74) *Attorney, Agent, or Firm* — Leydig, Voit & Mayer, Ltd.

(57) ABSTRACT

Embodiments of the present application provide a charging method, a charging device, a charging system, and an authentication device. According to the technical solutions provided in the embodiments of the present application, when the available service volume of the user is not enough at the time close to the tariff switch point, the operation of forcing a user to go offline may be performed selectively, depending on the specific situation. Therefore, the operation of forcing a user to go offline can meet requirements of increasingly complicated charging policies of the operator.

13 Claims, 7 Drawing Sheets

(52) U.S. Cl.
CPC .............. *H04W 4/24* (2013.01); *H04W 12/06* (2013.01); *H04L 12/1496* (2013.01)

(56) References Cited

FOREIGN PATENT DOCUMENTS

| | | |
|---|---|---|
| CN | 101312473 A | 11/2008 |
| CN | 102118724 A | 7/2011 |
| CN | 102340758 A | 2/2012 |
| WO | 2006107248 A2 | 10/2006 |

\* cited by examiner

Receive a service volume request that is sent by an authentication device according to an access request from an access device, where the service volume request carries a requested service unit

204

When a current available service volume is smaller than the requested service unit and a time interval between current time and a tariff switch point does not exceed a preset time interval, if an exception condition of forced offline is fulfilled, instruct the authentication device to return a granted service unit determined according to the current available service volume to the access device, and instruct, by using the authentication device, the access device to send a service volume request again when the granted service unit is used up

Receive an access request from an access device, and send a service volume request to a charging device, where the service volume request carries a requested service unit

304

When the charging device determines that a current available service volume is smaller than the requested service unit and a time interval between current time and a tariff switch point does not exceed a preset time interval, if an exception condition of forced offline is fulfilled, return a granted service unit determined according to the current available service volume to the access device, and instruct the access device to send a service volume request again upon arrival of the granted service unit

CHARGING METHOD, CHARGING DEVICE, CHARGING SYSTEM, AND AUTHENTICATION DEVICE

CROSS-REFERENCE TO RELATED APPLICATIONS

This application is a continuation of International Application No. PCT/CN2012/073629, filed on Apr. 9, 2012, which claims priority to Chinese Patent Application No. 201110288429.1, filed on Sep. 26, 2011, both of which are hereby incorporated by reference in their entireties.

TECHNICAL FIELD

The present application relates to charging authentication technologies, and in particular, to a charging method, a charging device, a charging system, and an authentication device.

BACKGROUND

The development of real-time charging technologies creates favorable conditions for an operator to further segment the market into specific sectors. For example, with a real-time charging technology, the operator may formulate multiple monthly packages corresponding to different durations to meet needs of different users. In another example, the operator may divide each day into different time segments according to network utilization status, and set different tariffs for the different time segments. For example, a high tariff is set for a network busy time segment (such as 20:00 to 23:00 everyday); and a low tariff is set, or even no fee is charged, in a network idle time segment (such as 06:00 to 08:00 everyday) (the 24 hour-clock is used throughout this application).

In an existing real-time charging technology, an operation is defined for forcing a user to go offline. If a current service volume available to the user, determined according to the current account balance and the current tariff, is smaller than a service unit requested by the user, all the available service volume is granted to the user as a granted service unit. When it is detected that the service volume used by the user has reached the limit of the granted service unit, the user is forced to go offline. However, the condition for performing the operation of forcing a user to go offline (e.g. when the current service volume available to the user, determined according to the current account balance and the current tariff of the user, is smaller than the service unit requested by the user) may be too simple, and therefore, can result in unexpected consequences under an operator's increasingly complicated charging policies, and various requirements set forth by the increasingly complicated charging policies of the operator can hardly be met. For example, with the existing real-time charging technology, when a user enters from a fee-charging time segment into a fee-free time segment during the use of a service, even if the user's account has a sufficient balance after the user enters the fee-free time segment, the user may still be forced offline after the tariff switching. Such a circumstance is described in detail with reference to FIG. 1.

Figure 1:
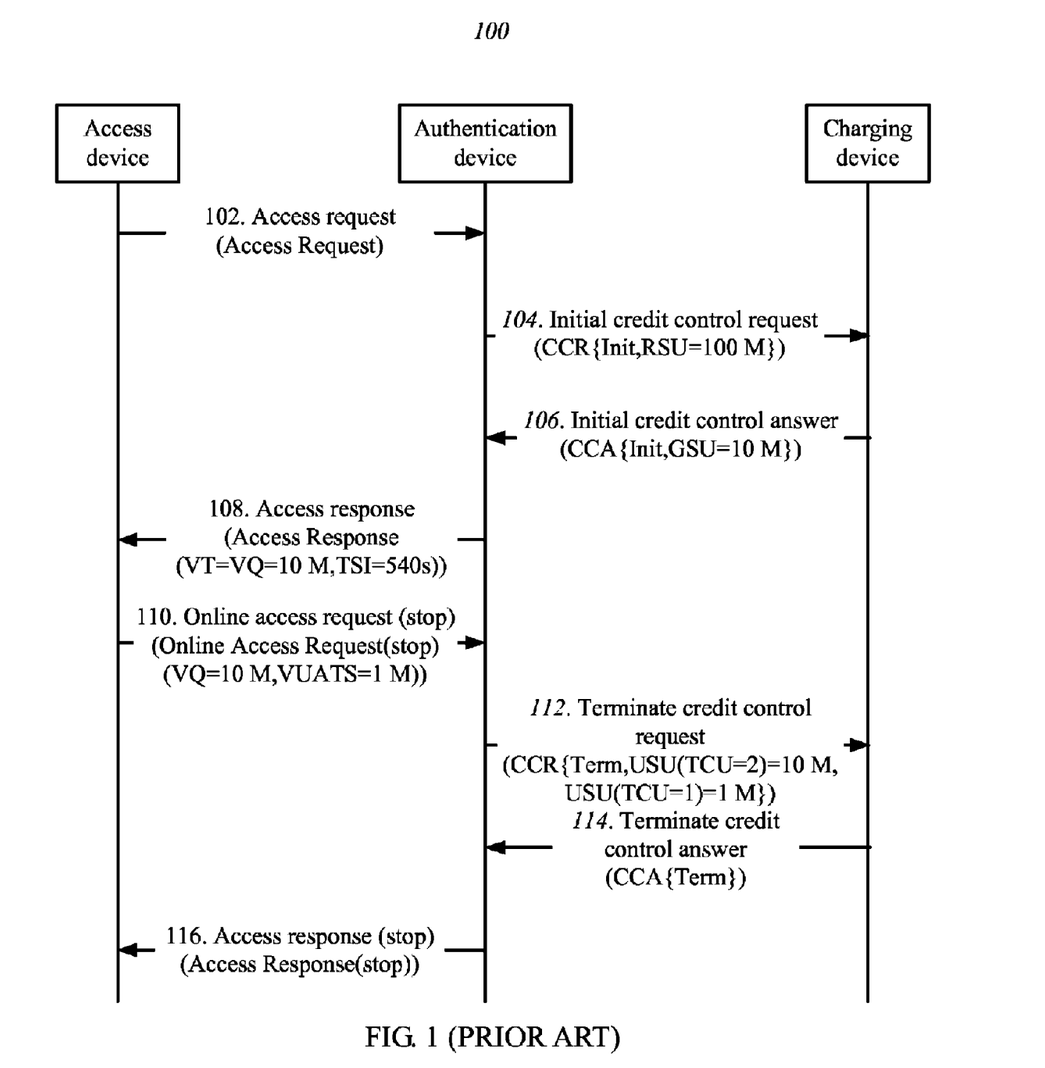
FIG. 1 is a signaling diagram of an existing real-time charging method.

FIG. 1 is a signaling diagram of an existing real-time charging method 100. In the scenario shown in FIG. 1, for example, 06:00 is a tariff switch point, and the tariff is 1 yuan per megabytes (yuan/M) before the tariff switching and is 0 yuan/M after the tariff switching. At 05:51, the user sends a login request to an access device, and the account balance of the user is 10 yuan at this time.

Step 102: The access device responds to the login request from the user, and sends an access request to an authentication device.

Step 104: The authentication device sends an initial credit control request (CCR {Init}) to a charging device, where the initial credit control request carries a requested service unit (RSU) of 100 M.

The charging device determines a current available service volume according to the current account balance and the current tariff of the user. If the current account balance of the user is 10 yuan, and the current tariff is 1 yuan/M, the current available service volume is determined to be 10 megabytes (M).

Step 106: The charging device sends an initial credit control answer (CCA {Init}) to the authentication device. Because the determined current available service volume 10 M is smaller than the requested service unit of 100 M, a granted service unit (GSU) carried in the CCA {Init} is 10 M, same as the current available service volume. If, on the other hand, the determined current available service volume is larger than or equal to the requested service unit 100 M, the granted service unit carried in the CCA{Init} is the same as the requested service unit, 100 M.

Step 108: The authentication device determines that the granted service unit 10 M carried in the CCA{Init} is smaller than the requested service unit 100 M, and therefore, grants all the 10 M service unit to the user. Specifically, the authentication device sends an access response to the access device. The access response carries a parameter VT=VQ=10 M, where VT is a volume threshold, and VQ is a volume quota. According to the existing technical specifications about real-time charging, the VT being equal to the VQ indicates that the access device should force the user to go offline when the used service unit of the user reaches the 10 M threshold. For ease of description, VT is hereinafter called a granted service unit. If, on the other hand, the granted service unit carried in the CCA{Init} is the requested service unit, such as 100 M, the VT carried in the access response will be set to be close to but smaller than the VQ, so that the access device will send a service volume request again when detecting that the used service unit of the user reaches the VT (that is, close to but not yet reached the VQ). The purpose of such a setting is that: At the time of requesting the charging device to grant a further volume to the user after the used service unit of the user has reached the VT, a small service volume, which equals to a difference between the VQ and the VT, is still available to the user. This avoids the problem that the service is unavailable to the user in the requesting process, where the problem occurs because the charging device is not requested again to grant a service volume to the user until VQ is reached.

Therefore, the purpose of setting the parameter "granted service unit" is to instruct the access device to send a request to the charging device again when the access device detects that the used service unit of the user reaches the granted service unit, where the request is a request for granting a further service volume to the user. In a specific implementation process, VT and VQ may be set according to specific needs. The access response further includes a tariff switch interval (TSI), which is used to indicate a time interval between the current time and the tariff switch point, to prompt the access device to separately report the service volume used before the tariff switch point and the service volume used after the tariff switch point. In FIG. 1, TSI=540 s indicates that the current time is 540 seconds away from the tariff switch point.

Step 110: When the used service unit of the user reaches 10 M, the access device sends an online access request (stop) to the authentication device, where the request carries the used service unit 10 M and indicates that, among the 10 M used service unit, the service volume used after the tariff switch point 06:00 is 1 M, i.e. a volume used after tariff switch (VUATS) is 1 M.

When the used service unit of the user reaches 10 M, the access device forces the user to go offline.

Step 112: The authentication device notifies the used service unit to the charging device through a terminate credit control request (CCR{Term}), where the used service unit is carried in a used service unit (USU) field. According to the existing technical specifications about the real-time charging, after the tariff is switched, two USUs will be reported respectively. A USU (TCU=2) represents the total service volume used in the previous charging cycle, 10 M; and a USU (TCU=1) represents the service volume used after tariff switching in the previous charging cycle, 1 M, where TCU represents tariff change usage.

Afterward, the charging device deducts a fee according to the used service unit. Because the service volume used before 06:00 is 9 M and the tariff before 06:00 is 1 yuan/M, the generated expense is 9 yuan; because the service volume used after 6:00 is 1 M and the tariff after 06:00 is 0 yuan/M, the generated expense is 0 yuan. Therefore, the total deducted fee is 9 yuan, and the user account balance is 1 yuan after the deduction.

Step 114: The charging device sends a terminate credit control answer (CCA{Term}) to the authentication device.

Step 116: The authentication device sends an access response (stop) (Access Response (stop)) to the access device.

As evidently revealed in the foregoing process, at the tariff switch point (06:00), the user uses only a 9 M service volume. Because the tariff before 06:00 is 1 yuan/M, the expense of the user is 9 yuan, and the user account balance at 06:00 is 1 yuan. According to the tariff after the tariff switch point (0 yuan/M), the user can continue using the service generously, the user can continue using the service at least before the fee-free time segment ends. However, according to the existing real-time charging method as shown in FIG. 1, the user will be still forced to go offline after the tariff switch point, even if the user account has a balance and the tariff switch point is followed by a fee-free time segment.

SUMMARY

In view of the above, it is an object of the application to provide a charging method so that the operation of forcing a user to go offline can meet requirements of increasingly complicated charging policies of an operator.

Meanwhile, a charging device is provided so that the operation of forcing a user to go offline can meet requirements of increasingly complicated charging policies of the operator.

Meanwhile, an authentication device is provided so that the operation of forcing a user to go offline can meet requirements of increasingly complicated charging policies of the operator.

Meanwhile, a charging system is provided so that the operation of forcing a user to go offline can meet requirements of increasingly complicated charging policies of the operator.

In one aspect, an embodiment of the present application provides a charging method that includes:

receiving, by a charging device, a service volume request from an authentication device according to an access request from an access device, where the service volume request carries a requested service unit; and when a current available service volume is smaller than the requested service unit and a time interval between current time and a tariff switch point does not exceed a preset time interval, and if an exception condition of forced offline is met, instructing, by the charging device, the authentication device to return a granted service unit determined according to the current available service volume to the access device, and instructing, via the authentication device, the access device to send a service volume request again when the granted service unit is used up.

In another aspect, an embodiment of the present application provides a charging method that includes:

receiving, by an authentication device, an access request from an access device, and sending a service volume request to a charging device, where the service volume request carries a requested service unit; and when the charging device determines that a current available service volume is smaller than the requested service unit and a time interval between current time and a tariff switch point does not exceed a preset time interval, if an exception condition of forced offline is met, returning a granted service unit determined according to the current available service volume to the access device, and instructing the access device to send a service volume request again when the granted service unit is used up.

In still another aspect, an embodiment of the present application provides a charging method, including:

receiving a service volume request from an access request, where the service volume request carries a requested service unit; and when a current available service volume is smaller than the requested service unit and a time interval between current time and a tariff switch point does not exceed a preset time interval, if an exception condition of forced offline is met, returning a granted service unit determined according to the current available service volume to the access device, and instructing the access device to send a service volume request again when the granted service unit is used up.

In still another aspect, an embodiment of the present application provides a charging device, including:

a receiving module, configured to receive a service volume request sent by an authentication device according to an access request from an access device, where the service volume request carries a requested service unit; and a granting module, configured to: when a current available service volume is smaller than the requested service unit and a time interval between current time and a tariff switch point does not exceed a preset time interval, if an exception condition of forced offline is met, instruct the authentication device to return a granted service unit determined according to the current available service volume to the access device, and instruct, by using the authentication device, the access device to send a service volume request again when the granted service unit is used up.

In still another aspect, an embodiment of the present application provides an authentication device, including:

a transceiver module, configured to receive an access request from an access device, and send a service volume request to a charging device, where the service volume request carries a requested service unit; and a notifying module, configured to: when the charging device determines that a current available service volume is smaller than the requested service unit and a time interval between current time and a tariff switch point does not exceed a preset time interval, if an exception condition of forced offline is met, return a granted service unit determined according to the current available service volume to the access device, and instruct the access device to send a service volume request again when the granted service unit is used up.

In still another aspect, an embodiment of the present application provides a charging device, including:

a receiving module, configured to receive a service volume request from an access request, where the service volume request carries a requested service unit; and a granting module, configured to: when a current available service volume is smaller than the requested service unit and a time interval between current time and a tariff switch point does not exceed a preset time interval, if an exception condition of forced offline is met, return a granted service unit determined according to the current available service volume to the access device, and instruct the access device to send a service volume request again when the granted service unit is used up.

In still another aspect, an embodiment of the present application provides a charging system, including:

an authentication device, configured to receive an access request from an access device, and send a service volume request, where the service volume request carries a requested service unit; and a charging device, configured to: receive the service volume request, and when a current available service volume is smaller than the requested service unit and a time interval between current time and a tariff switch point does not exceed a preset time interval, if an exception condition of forced offline is met, instruct the authentication device to return a granted service unit determined according to the current available service volume to the access device, and instruct, by using the authentication device, the access device to send a service volume request again when the granted service unit is used up.

According to the technical solutions provided in the embodiments of the present application, when the available service volume of the user is not enough at the time close to the tariff switch point, the operation of forcing a user to go offline may be performed selectively, depending on the specific situation. Therefore, the operation of forcing a user to go offline can meet requirements of increasingly complicated charging policies of the operator.

BRIEF DESCRIPTION OF DRAWINGS

To illustrate the technical solutions in the embodiments of the present application more clearly, the following briefly introduces the accompanying drawings for describing the embodiments of the present application. Apparently, the accompanying drawings in the following description show merely some embodiments of the present application, and a person of ordinary skill in the art may still derive other drawings from these accompanying drawings without creative efforts.

DETAILED DESCRIPTION

Figure 2:
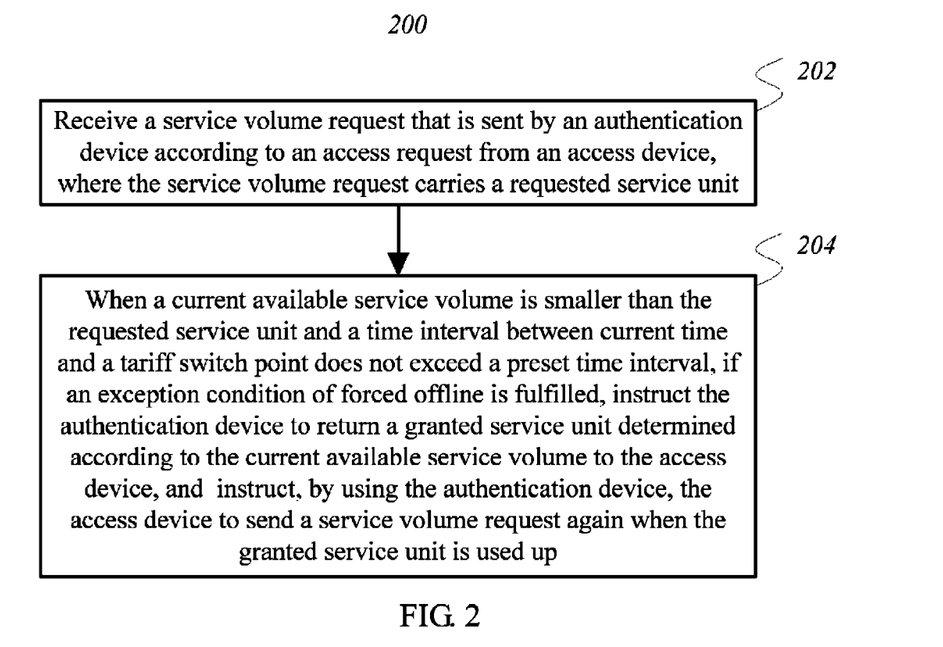
FIG. 2 is an exemplary flowchart of a charging method according to an embodiment of the present application.

FIG. 2 is an exemplary flowchart of a charging method 200 according to an embodiment of the present application. In a specific implementation process, the charging method 200 may be implemented by a charging device. The charging device may be, but is not limited to, a pre-paid server (PPS). The pre-paid server may be, but is not limited to, an online charging system (OCS).

Step 202: The charging device receives a service volume request from an authentication device according to an access request from an access device. The service volume request carries a requested service unit.

In a specific implementation process applied to a Worldwide Interoperability for Microwave Access (WiMAX) network, the access device may be an access service network-gateway (ASN-GW) or a home agent (HA). In a specific implementation process applied to a Code Division Multiple Access (CDMA) network, the access device may be a packet data serving node (PDSN) or a HA. The authentication device may be, but is not limited to, an authentication, authorization and accounting (AAA) server.

Step 204: When a current available service volume is smaller than the requested service unit and a time interval between a current time and a tariff switch point does not exceed a preset time interval, and if an exception condition of forced offline is met, the charging device instructs the authentication device to return a granted service unit determined according to the current available service volume to the access device, and instructs, via the authentication device, the access device to send a service volume request again when the granted service unit is used up.

Specifically, in step 204, the instructing the authentication device to return a granted service unit determined according to the current available service volume to the access device specifically includes: returning the current available service volume to the authentication device, so that the authentication device determines the granted service unit according to the current available service volume and returns the granted service unit to the access device, returning the current available service volume to the authentication device so as to instruct the authentication device to determine the granted service unit according to the current available service volume and return the granted service unit to the access device.

In a specific implementation process, the current available service volume is calculated according to the current account balance and the current tariff. When the time interval between the current time and the tariff switch point does not exceed the preset time interval, it indicates that the current time is close to the tariff switch point. In a specific implementation process, the preset time interval may be set according to specific needs.

In a specific implementation process, the exception condition of forced offline may be that the current tariff is higher than the tariff applied after the tariff switch point. For example, the service is charged before the tariff switch point but is free of charge after the tariff switch point, the tariff is zero after the tariff switch point. The merit of such an exception condition of forced offline lies in simplicity of processing. Because the scenario where the service is charged before the tariff switch point and is free of charge after the tariff switch point is very common, such an exception condition of forced offline can meet requirements of many operators.

On condition that the exception condition of forced offline is that the current tariff is higher than the tariff applied after the tariff switch point (the tariff applied after the tariff switch point may be zero or not), another condition may also be added in the exception condition of forced offline: The current available service volume is not smaller than a preset service volume threshold. The reason for adding such a condition is that: if the current available service volume is too small, the available service volume will probably be used up by the user before arrival of the tariff switch point; if the available service volume is used up by the user before arrival of the tariff switch point, if the user account has no balance before arrival of the tariff switch point, forcing the user to go offline is not unreasonable. In a specific implementation process, the preset service volume threshold may be determined properly according to factors such as network conditions, an access rate, and duration of the preset time interval. After the foregoing condition is added in the exception condition of forced offline, the judgment about whether to force the user to go offline will be more reasonable.

In a specific implementation process, the exception condition of forced offline may also be that the current available service volume is not smaller than a rated service volume determined according to a preset rated access rate and the time interval between the current time and the tariff switch point. According to the prior art, the current available service volume is calculated according to the current account balance and the current tariff. If the calculated current available service volume is not used up after the tariff switch point, the user is still required, after the tariff switch point, to continue using the service volume left over after the tariff switch point in the current available service volume, indicating that the leftover available service volume of the user is still determined according to the tariff applied before the tariff switch point instead of the tariff applied after the tariff switch point, which is obviously unreasonable. This is because, when the tariff decreases after the tariff switch point, the available service volume calculated according to the changed tariff will be higher than the leftover service volume. Forcing the user to go offline after the leftover service volume is used up is more unreasonable. Assuming that the tariff applied after the tariff switch point is zero, once the user continues using the service until after the tariff switch point, if the granted service unit granted to the user before the tariff switch point still has a leftover, the user account still has a balance. Because the tariff applied after the tariff switch point is zero, the user can continue using the service until the end of the free time segment. Under such circumstances, it is obviously unreasonable to force the user to continue using the leftover service, and after the leftover service volume is used up, to force the user to go offline. Under such circumstances, if the exception condition of forced offline is set as that: the current available service volume is not smaller than a rated service volume determined according to a preset rated access rate and the time interval between the current time and the tariff switch point, as regards a user whose current available service volume is sufficient to be used until the tariff switch point, the user is not forced to go offline after the current available service volume is used up, but instead, a service volume request is sent again for the user. According to the existing charging principles, if the current available service volume is not used up until after the tariff switch point, the used service volume (the previously calculated current available service volume) will be charged at a tariff before the tariff switch point and at a tariff after the tariff switch point respectively. In this way, if the tariff is lower after the tariff switch point, the user account definitely has a balance after the charging according to the foregoing charging principles, and therefore the user can continue using the service. In a specific implementation process, the preset rated access rate may be set according to the highest rate available from a communication network, or may be set according to the highest rate allowed by a service or package selected by the user. The application scenario of such an exception condition of forced offline is more universally applicable.

A person skilled in the art should understand that although the embodiments of the present application are described based on the several exception conditions of forced offline, other exception conditions of forced offline may also be set according to the charging policy of the operator in a specific implementation process. Therefore, the protection scope of the present application is not limited to the several exception conditions of forced offline.

Additionally, the method 200 may further include: when the current available service volume is smaller than the requested service unit and a time interval between current time and a tariff switch point does not exceed a preset time interval, if the exception condition of forced offline is not met, returning a granted service unit determined according to the current available service volume to the access device by using the authentication device, and instructing, by using the authentication device, the access device to perform a forced offline operation when the granted service unit is used up. In a specific implementation process, as described above, the step of instructing the access device to perform a forced offline operation when the granted service unit is used up is generally implemented by setting a volume threshold (VT) to be equal to a volume quota (VQ). In this case, the values of both VT and VQ are the current available service volume.

According to the technical solution provided in the embodiment of the present application, when the available service volume of the user is not enough at the time close to the tariff switch point, the operation of forcing a user to go offline may be performed selectively, depending on the specific situation. Therefore, the operation of forcing a user to go offline can meet requirements of increasingly complicated charging policies of the operator.

Figure 3:
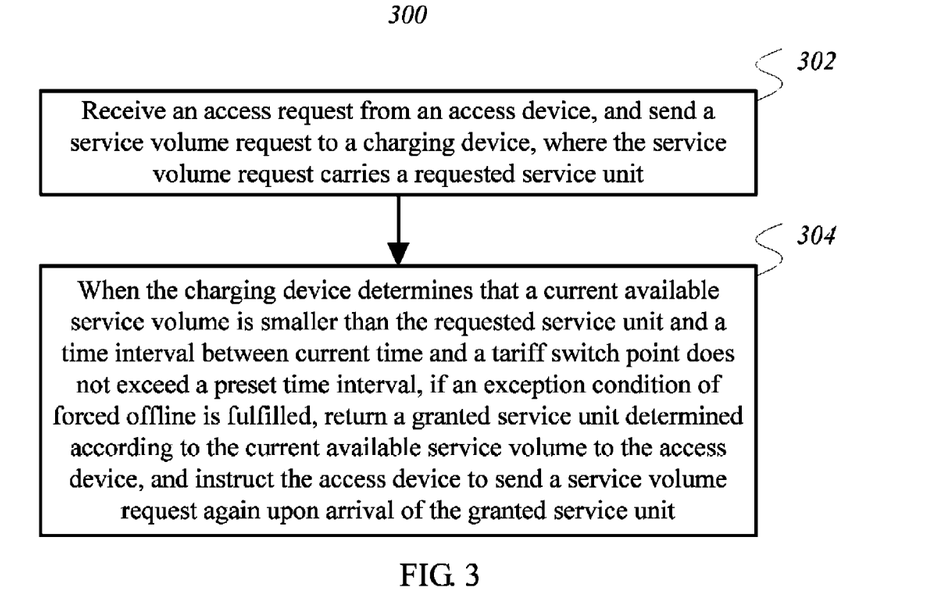
FIG. 3 is an exemplary flowchart of a charging method according to an embodiment of the present application.

FIG. 3 is an exemplary flowchart of a charging method 300 according to an embodiment of the present application. In a specific implementation process, the charging method 300 may be implemented by an authentication device. The authentication device may be, but is not limited to, an authentication, authorization and accounting (AAA) server.

Step 302: Receive an access request from an access device, and send a service volume request to a charging device, where the service volume request carries a requested service unit.

Step 304: When the charging device determines that a current available service volume is smaller than the requested service unit and a time interval between current time and a tariff switch point does not exceed a preset time interval, if an exception condition of forced offline is met, return a granted service unit determined according to the current available service volume to the access device, and instruct the access device to send a service volume request again when the granted service unit is used up. Specifically, after the authentication device receives a notification sent by the charging device when the charging device determines that a current available service volume is smaller than the requested service unit and a time interval between current time and a tariff switch point does not exceed a preset time interval and if the exception condition of forced offline is met, the authentication device may return a granted service unit determined according to the current available service volume to the access device, and instruct the access device to send a service volume request again when the granted service unit is used up.

Specifically, in step 304, the returning a granted service unit determined according to the current available service volume to the access device specifically includes: determining a granted service unit according to the current available service volume, and returning the granted service unit to the access device.

In a specific implementation process, the exception condition of forced offline may be that the current tariff is higher than the tariff applied after the tariff switch point. For example, the service is charged before the tariff switch point but is free of charge after the tariff switch point, the tariff is zero after the tariff switch point.

On condition that the exception condition of forced offline is that the current tariff is higher than the tariff applied after the tariff switch point (the tariff applied after the tariff switch point may be zero or not), another condition may also be added in the exception condition of forced offline: The current available service volume is not smaller than a preset service volume threshold.

In a specific implementation process, the exception condition of forced offline may also be that the current available service volume is not smaller than a rated service volume determined according to a preset rated access rate and the time interval between the current time and the tariff switch point.

Details about the current available volume, the preset time interval, and the exception condition of forced offline have been given above, which are not repeated here any further.

The charging methods provided in FIG. 2 and FIG. 3 are further described below through specific examples.

Figure 4:
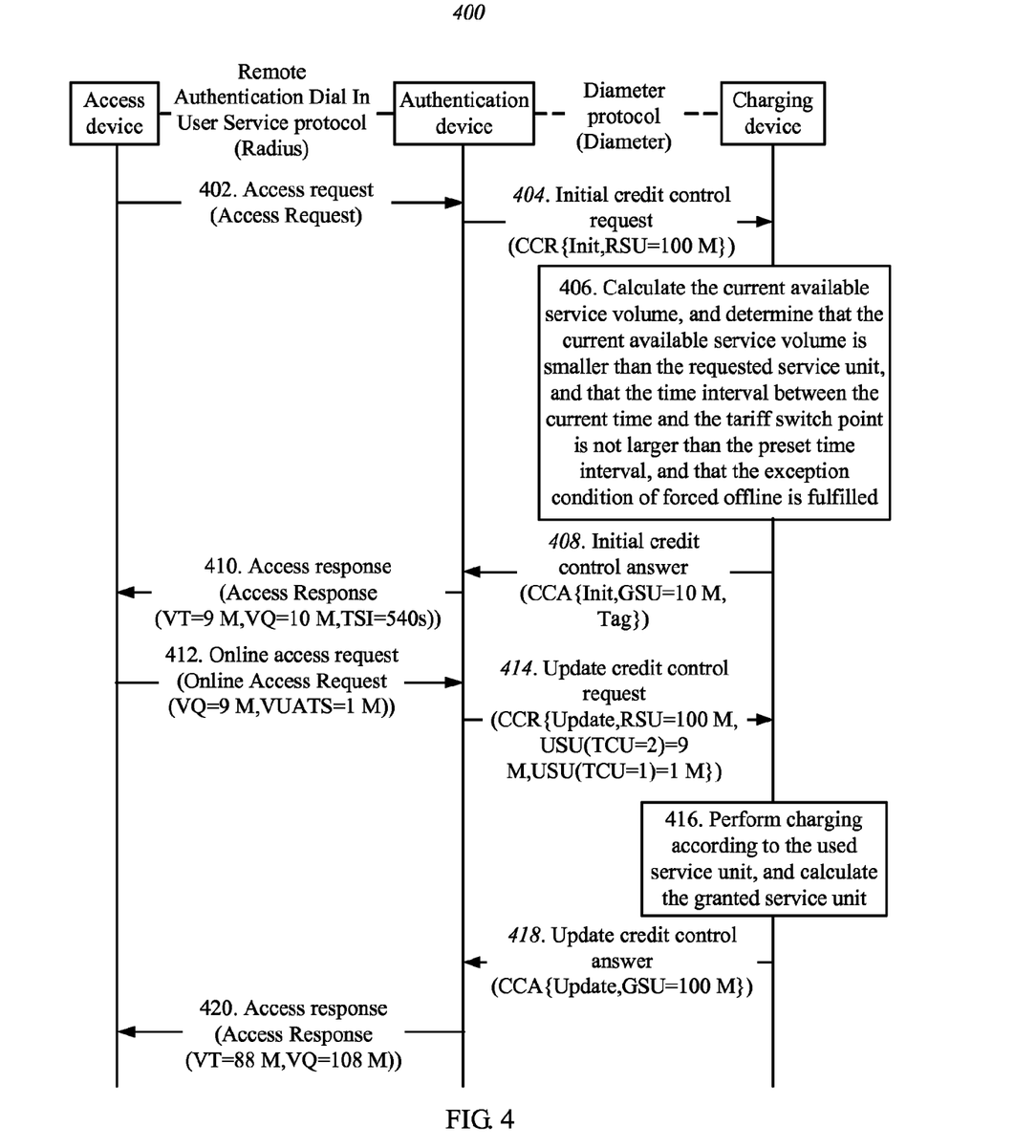
FIG. 4 is an exemplary signaling diagram of a charging method according to an embodiment of the present application.

FIG. 4 is an exemplary signaling diagram of a charging method 400 according to an embodiment of the present application. In this embodiment, an access device communicates with an authentication device according to a Remote Authentication Dial in User Service (Radius) protocol, and the authentication device communicates with a charging device according to a Diameter protocol. The authentication device may be, but is not limited to, an authentication, authorization and accounting (AAA) server. In addition, in this embodiment, 06:00 is a tariff switch point, the tariff switches at 06:00, and the tariff is 1 yuan/M before the switching and is 0 yuan/M after the switching. In other words, no fee is charged after the switching. In a specific implementation process, the exception condition of forced offline may be any one of the multiple conditions described above. In this embodiment, the exception condition of forced offline is that: the current tariff is higher than the tariff applied after the tariff switch point, and the tariff applied after the tariff switch point is zero. Meanwhile, in this embodiment, the preset time interval, which judges whether the current time is close to the tariff switch point, is 600 seconds. The access request illustrated in FIG. 2 and FIG. 3 is specifically an access request and an online access request in this embodiment, and the service volume request illustrated in FIG. 2 and FIG. 3 is specifically an initial Credit Control Request and an update credit control request in this embodiment.

At 05:51, the user sends a login request to an access device, and the current account balance of the user is 10 yuan at this time.

Step 402: The access device responds to the login request from the user, and sends an access request to an authentication device.

Step 404: The authentication device sends an initial credit control request (CCR{Init}) to a charging device, where the initial credit control request carries a requested service unit (RSU) of 100 M.

Step 406: The charging device determines the current available service volume according to the current account balance and the current tariff of the user. Because the current account balance of the user is 10 yuan, the current available service volume is determined as 10 M according to the current tariff 1 yuan/M.

Because the time when the user sends a login request to the access device is 05:51, the time interval between the current time and the tariff switch point is 540 seconds. Because the current available service volume 10 M is smaller than the requested service unit 100 M and the time interval between the current time and the tariff switch point is 540 seconds which is not larger than the preset time interval 600 seconds, the charging device judges whether the exception condition of forced offline is met. As mentioned above, in this embodiment, the exception condition of forced offline is that: the current tariff is higher than the tariff applied after the tariff switch point, and the tariff applied after the tariff switch point is zero. In this embodiment, the tariff before switching is 1 yuan/M, and the tariff after switching is 0 yuan/M, and therefore, the charging device determines that the exception condition of forced offline is met.

Step 408: The charging device sends an initial credit control answer (CCA{Init}) to the authentication device. Because the current available service volume 10 M determined according to the current account balance and the current tariff is smaller than the requested service unit 100 M, the granted service unit (GSU) carried in the CCA{Init} is the current available service volume 10 M. In addition, the charging device adds a tag into the CCA {Init}, thereby notifying the authentication device that the exception condition of forced offline is met. A person skilled in the art should understand that in a specific implementation process, that the exception condition of forced offline is met may be notified to the authentication device in other manners. In a specific implementation process, the tag may be implemented by a specific field in the CCA{Init}, such as one of various reserved fields or extension fields. For example, the charging device may determine an estimated available service volume according to the current account balance and the tariff applied after the tariff switch point, determine an estimated granted service unit according to the estimated available service volume, and add the estimated granted service unit as a GSU (TCU) into the CCA{Init}, where the TCU represents tariff change usage. In this embodiment, the calculated estimated available service volume is unlimited usage until the end of the free time segment. Because the estimated available service volume is larger than the requested service unit 100 M, the returned estimated granted service unit is the requested service unit 100 M. In this embodiment, the estimated granted service unit (GSU (TCU)) larger than the granted service unit (GSU) is used as the tag to notify the authentication device that the exception condition of forced offline is met. If determining that the CCA{Init} carries the GSU (TCU) and GSU (TCU) is larger than the GSU, the authentication device determines that the exception condition of forced offline is met.

Step 410: The authentication device determines, according to the tag carried in the CCA {Init}, that the exception condition of forced offline is met. Under such circumstances, the authentication device determines a proper granted service unit 9 M according to the granted service unit 10 M carried in the CCA {Init}, and sends an access response to the access device accordingly, so that the access device authorizes the user to use the service and monitors the used service unit of the user. The access response carries parameters VT=9 M and VQ=10 M. Because the VT is not equal to the VQ, according to the technical specifications about real-time charging, the access device sends an access request again rather than forces the user to go offline when the used service unit of the user reaches the VT. The access response further includes a tariff switch interval (TSI), which is used to indicate a time interval between the current time and the tariff switch point, to prompt the access device to separately report the service volume used before the tariff switch point and the service volume used after the tariff switch point. TSI=540 s indicates that the current time is 540 seconds away from the tariff switch point (the time loss in the process of transmitting and processing the message is ignored).

In a specific implementation process, the authentication device may determine the VT in various manners according to specific needs, but needs to ensure that the VT is not equal to the VQ when the exception condition of forced offline is met. For example, according to technical specifications about real-time charging, when detecting that the used service unit of the user reaches the granted service unit VT, the access device needs to request the charging device again to grant a service volume to the user. The difference between the VQ and the VT is available to the user while the access device requests the charging device again to grant a service volume to the user. In a specific implementation process, the time required by the process of requesting the charging device again to grant a service volume to the user may be statistically estimated, and then according to the statistically estimated time and a preset maximum access rate, a maximum service volume used in the process of requesting the charging device again to grant a service volume to the user is calculated. The VT can be estimated by using the maximum used service unit as a difference between the VQ and the VT. In a specific implementation process, the preset maximum access rate may be set according to the highest rate available from a communication network, or may be set according to the highest rate allowed by a service or package selected by the user. The preset service volume threshold, which can be used as one of the exception conditions of forced offline as mentioned above, may also be set as the maximum used service unit.

Step 412: After the user is authorized to use the service, when the used service unit of the user is detected as reaching 9 M, the access device sends an online access request to the authentication device, where the online access request carries the used service unit 9 M and indicates that, among the 9 M used service unit, the service volume used after the tariff switch point 06:00, VUATS (volume used after tariff switch), is 1 M.

Step 414: The authentication device sends an update credit control request (CCR {Update}) to notify the used service unit to the charging device, where the used service unit is carried in a used service unit (USU) field. Due to tariff switching, as mentioned above, two USUs will be reported respectively. A USU (TCU=2) represents the total service volume used in the previous charging cycle, 9 M; and a USU (TCU=1) represents the service volume used after tariff switching in the previous charging cycle, 1 M. Further, the update credit control request carries the requested service unit RSU 100 M.

Step 416: The charging device performs charging according to the used service unit, and calculates the granted service unit.

Specifically, because the service volume used before 06:00 is 8 M and the tariff before 06:00 is 1 yuan/M, the generated expense is 8 yuan; because the service volume used after 06:00 is 1 M and the tariff after 06:00 is 0 yuan/M, the generated expense is 0 yuan. Therefore, after the fee is deducted, the user account balance is 2 yuan.

Step 418: The charging device returns an update credit control answer (CCA {Update}) to the authentication device, where the granted service unit (GSU) carried in the update credit control answer is 100 M.

Specifically, according to the current account balance 2 yuan and the current tariff 0 yuan/M of the user, the charging device determines that the current available service volume is unlimited usage. As mentioned above, if the calculated current available service volume exceeds the requested service unit, the charging device returns the requested service unit (100 M) as a granted service unit to the authentication device.

Step 420: After receiving the CCA {Update}, the authentication device returns an access response to the access device, where the access response carries VT=88 M and VQ=108 M.

Figure 5:
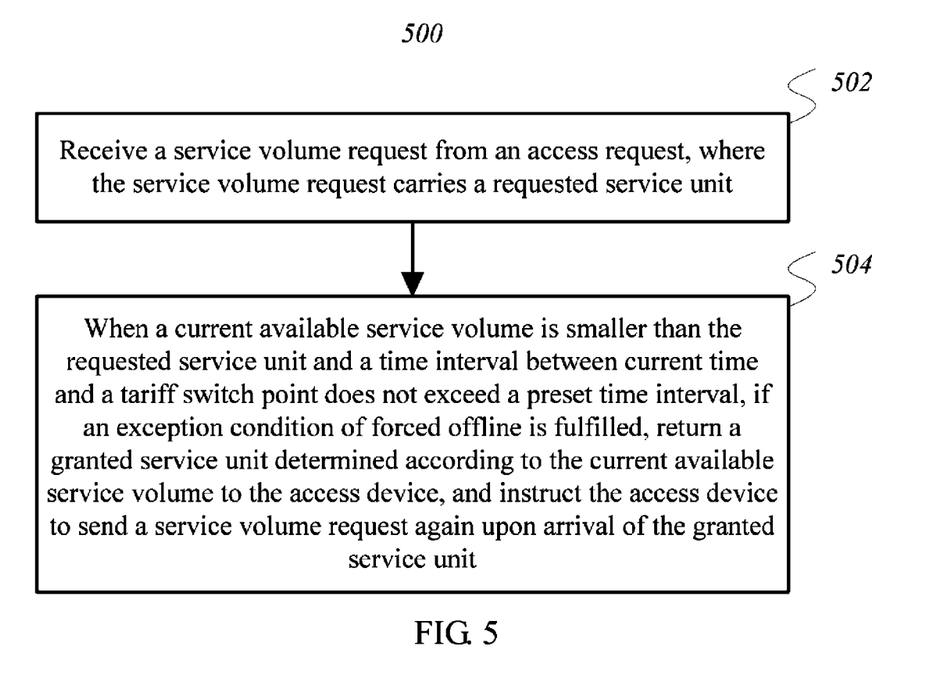
FIG. 5 is an exemplary flowchart of a charging method according to another embodiment of the present application.

FIG. 5 is an exemplary flowchart of a charging method 500 according to another embodiment of the present application. In a specific implementation process, the charging method 500 may be implemented by, for example but not limited to, a charging device.

Step 502: Receive a service volume request from an access request, where the service volume request carries a requested service unit.

Step 504: When a current available service volume is smaller than the requested service unit and a time interval between current time and a tariff switch point does not exceed a preset time interval, if an exception condition of forced offline is met, return a granted service unit determined according to the current available service volume to the access device, and instruct the access device to send a service volume request again when the granted service unit is used up.

Compared with the charging method 200 shown in FIG. 2, in the charging method 500 shown in FIG. 5, the access device directly requests the charging device to grant a service volume to the user, without involving an authentication device.

In a specific implementation process, the exception condition of forced offline may be that the current tariff is higher than the tariff applied after the tariff switch point. For example, the service is charged before the tariff switch point but is free of charge after the tariff switch point.

On condition that the exception condition of forced offline is that the current tariff is higher than the tariff applied after the tariff switch point (the tariff applied after the tariff switch point may be zero or not), another condition may also be added in the exception condition of forced offline: The current available service volume is not smaller than a preset service volume threshold.

In a specific implementation process, the exception condition of forced offline may also be that the current available service volume is not smaller than a rated service volume determined according to a preset rated access rate and the time interval between the current time and the tariff switch point.

Additionally, the method 500 may further include: when the current available service volume is smaller than the requested service unit and a time interval between current time and a tariff switch point does not exceed a preset time interval, if the exception condition of forced offline is not met, returning a granted service unit determined according to the current available service volume to the access device, and instructing the access device to perform a forced offline operation when the granted service unit is used up. In a specific implementation process, as described above, the step of instructing the access device to perform a forced offline operation when the granted service unit is used up is generally implemented by setting a volume threshold (VT) to be equal to a volume quota (VQ), where the VT is the granted service unit. In this case, the values of both VT and VQ are the current available service volume.

Details about the current available volume, the preset time interval, and the exception condition of forced offline have been given above, which are not repeated here any further.

The charging method provided in FIG. 5 is further described below through a specific example.

Figure 6:
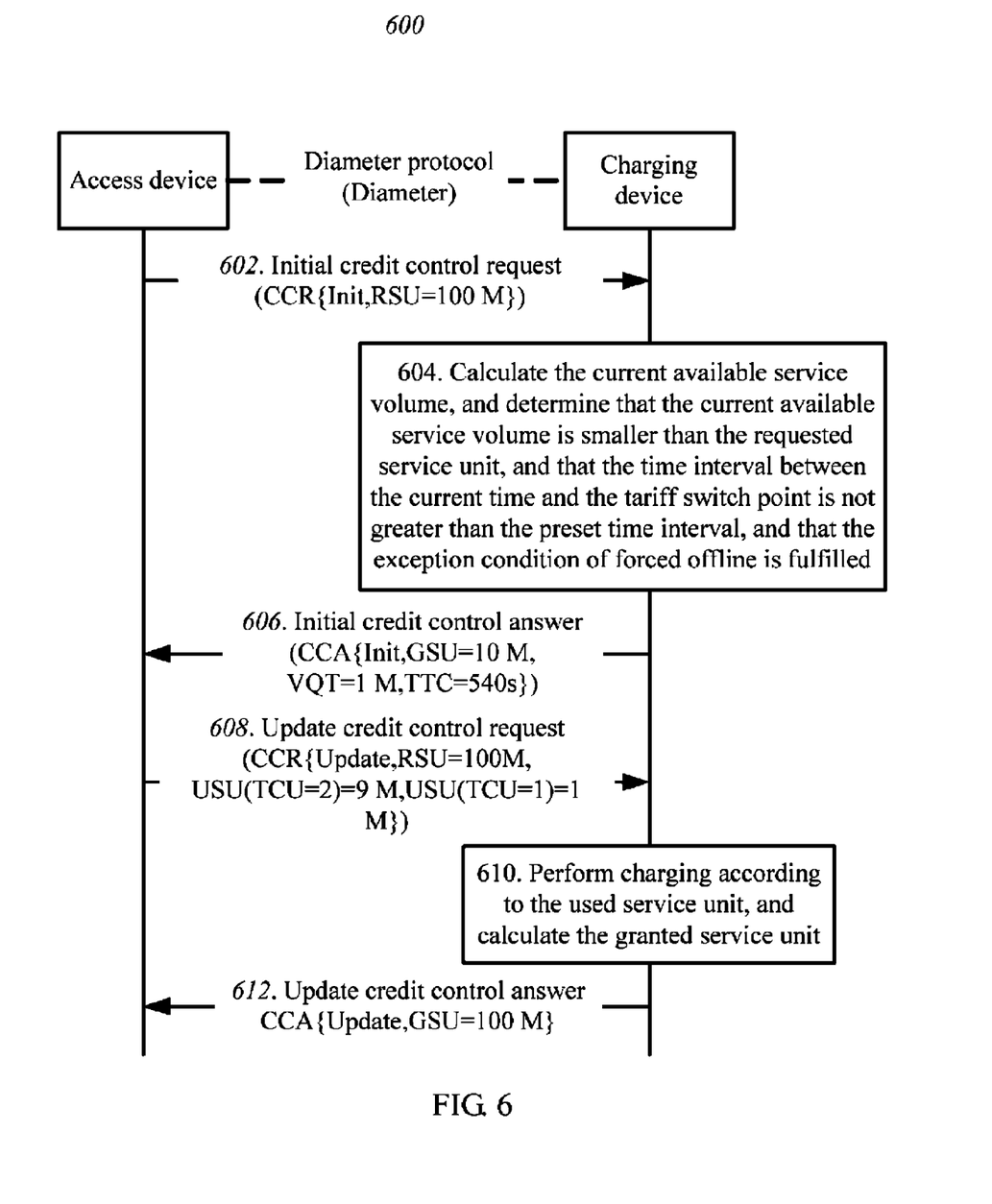
FIG. 6 is an exemplary signaling diagram of a charging method according to an embodiment of the present application.

FIG. 6 is an exemplary signaling diagram of a charging method 600 according to an embodiment of the present application. In this embodiment, an access device communicates with a charging device according to a Diameter protocol. In addition, in this embodiment, 06:00 is a tariff switch point, and the tariff is 1 yuan/M before the switching and is 0 yuan/M after the switching. In other words, no fee is charged after the switching. In a specific implementation process, the exception condition of forced offline may be any one of the multiple conditions described above. In this embodiment, the exception condition of forced offline is that: the current tariff is higher than the tariff applied after the tariff switch point, and the tariff applied after the tariff switch point is zero. Meanwhile, in this embodiment, the preset time interval, which judges whether the current time is close to the tariff switch point, is 600 seconds. The service volume request illustrated in FIG. 5 is specifically an initial credit control request and an update credit control request in this embodiment.

At 05:51, the user sends a login request to an access device, and the current account balance of the user is 10 yuan at this time.

Step 602: The access device sends an initial credit control request (CCR{Init}) to a charging device, where the initial credit control request carries a requested service unit (RSU) 100 M.

Step 604: The charging device determines the current available service volume according to the current account balance and the current tariff of the user. Because the current account balance of the user is 10 yuan, the current available service volume is determined as 10 M according to the current tariff of 1 yuan/M.

Because the time when the user sends a login request to the access device is 05:51, the time interval between the current time and the tariff switch point is 540 seconds. Because the current available service volume 10 M is smaller than the requested service unit 100 M and the time interval between the current time and the tariff switch point is 540 seconds which is not larger than the preset time interval 600 seconds, the charging device judges whether the exception condition of forced offline is met. As mentioned above, in this embodiment, the exception condition of forced offline is that: the current tariff is higher than the tariff applied after the tariff switch point, and the tariff applied after the tariff switch point is zero. In this embodiment, the tariff before switching is 1 yuan/M, and the tariff after switching is 0 yuan/M, and therefore, the charging device determines that the exception condition of forced offline is met.

Step 606: The charging device sends an initial credit control answer (CCA {Init}) to the authentication device, so that the access device authorizes the user to use the service and monitors the used service unit of the user. Because the current available service volume 10 M determined according to the current account balance and the current tariff is smaller than the requested service unit 100 M, the granted service unit (GSU) carried in the CCA{Init} is the current available service volume 10 M. The exception condition of forced offline is met. Therefore, the charging device returns a granted service unit determined according to the current available service volume to the access device, and instructs the access device to send a service volume request again when the granted service unit is used up. Specifically, in this embodiment, the charging device sets VQT=1 M in the CCA {Init}, where VQT is a volume quota threshold, and is used to instruct the access device to send a charging request again to the charging device when the leftover of the granted service unit is 1 M (the used service unit of the user reaches 9 M). Therefore, the 9 M is the granted service unit. The initial credit control answer further carries a TTC parameter. The TTC parameter is tariff time change, which is used to indicate a time interval between the current time and the tariff switch point, and prompt the access device to separately report the service volume used before the tariff switch point and the service volume used after the tariff switch point. TSI=540 s indicates that the current time is 540 seconds away from the tariff switch point.

Step 608: After the user is authorized to use the service, when the used service unit of the user is detected as reaching 9 M, the access device sends an update credit control request CCR{Update} to notify the used service unit to the charging device, where the used service unit is carried in a used service unit (USU) field. Due to tariff switching, according to technical specifications about real-time charging, two USUs will be reported respectively. A USU (TCU=2) represents the total service volume used in the previous charging cycle, 9 M; and a USU (TCU=1) represents the service volume used after tariff switching in the previous charging cycle, 1 M. Further, the update credit control request carries the requested service unit RSU 100 M.

Step 610: The charging device performs charging according to the used service unit, and calculates the granted service unit.

Specifically, because the service volume used before 06:00 is 8 M and the tariff before 6:00 is 1 yuan/M, the generated expense is 8 yuan; because the service volume used after 06:00 is 1 M and the tariff after 06:00 is 0 yuan/M, the generated expense is 0 yuan. Therefore, after the fee is deducted, the user account balance is 2 yuan.

Step 612: The charging device returns an update credit control answer (CCA {Update}) to the access device, where the granted service unit GSU carried in the update credit control answer is 100 M.

Specifically, according to the current account balance 2 yuan and the current tariff 0 yuan/M of the user, the charging device determines that the current available service volume is unlimited usage. As mentioned above, if the calculated current available service volume exceeds the requested service unit, the charging device returns the requested service unit (100 M) as a granted service unit to the authentication device.

Figure 7:
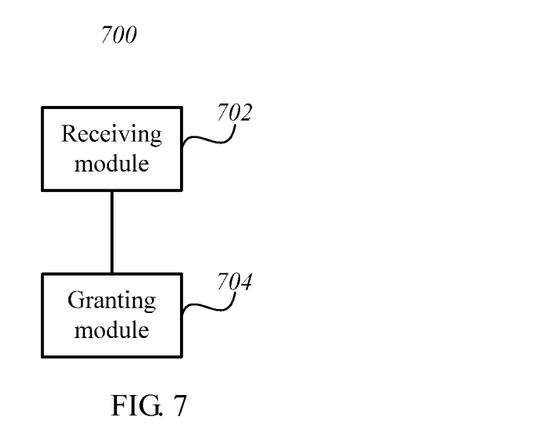
FIG. 7 is a simplified block diagram of a charging device according to an embodiment of the present application.

FIG. 7 is a schematic diagram of a logical structure of a charging device 700 according to an embodiment of the present application. As shown in FIG. 7, the charging device 700 includes a receiving module 702 and a granting module 704.

The receiving module 702 is configured to receive a service volume request sent by an authentication device according to an access request from an access device, where the service volume request carries a requested service unit.

The granting module 704 is configured to: when a current available service volume is smaller than the requested service unit and a time interval between current time and a tariff switch point does not exceed a preset time interval, if an exception condition of forced offline is met, instruct the authentication device to return a granted service unit determined according to the current available service volume to the access device, and instruct, by using the authentication device, the access device to send a service volume request again when the granted service unit is used up.

Specifically, when instructing the authentication device to return the granted service unit determined according to the current available service volume to the access device, the granting module 704 is specifically configured to return the current available service volume to the authentication device so that the authentication device determines the granted service unit according to the current available service volume and returns the granted service unit to the access device, instruct the authentication device to determine the granted service unit according to the current available service volume and return the granted service unit to the access device.

In a specific implementation process, the exception condition of forced offline may be that the current tariff is higher than the tariff applied after the tariff switch point. For example, the service is charged before the tariff switch point but is free of charge after the tariff switch point, the tariff is zero after the tariff switch point.

On condition that the exception condition of forced offline is that the current tariff is higher than the tariff applied after the tariff switch point (the tariff applied after the tariff switch point may be zero or not), another condition may also be added in the exception condition of forced offline: The current available service volume is not smaller than a preset service volume threshold.

In a specific implementation process, the exception condition of forced offline may also be that the current available service volume is not smaller than a rated service volume determined according to a preset rated access rate and the time interval between the current time and the tariff switch point.

Details about the current available volume, the preset time interval, and the exception condition of forced offline have been given above, which are not repeated here any further.

In a specific implementation process, the granting module 704 is further configured to: when the current available service volume is smaller than the requested service unit and a time interval between current time and a tariff switch point does not exceed a preset time interval, if the exception condition of forced offline is not met, return a granted service unit determined according to the current available service volume to the access device by using the authentication device, and instruct, by using the authentication device, the access device to perform a forced offline operation when the granted service unit is used up.

It should be noted that in a specific implementation process, the charging device 700 further includes necessary hardware modules such as a processor and a transceiver. The operations of the foregoing modules should be understood as operations implemented by the processor and/or the transceiver after corresponding instructions are delivered to the processor and/or the transceiver. The charging device 700 further includes necessary hardware modules such as a memory for storing data. The receiving module 702 is configured to receive, by using the transceiver, a service volume request sent by an authentication device according to an access request from an access device. The granting module 704 is configured to: use the processor to determine that a current available service volume is smaller than the requested service unit, and use the processor to determine that a time interval between current time and a tariff switch point does not exceed a preset time interval and that an exception condition of forced offline is met; and use the transceiver to return, by using the authentication device, a granted service unit determined according to the current available service volume to the access device, and to instruct, by using the authentication device, the access device to send a service volume request again when the granted service unit is used up. The granting module 704 is further configured to: use the processor to determine that a current available service volume is smaller than the requested service unit, and that a time interval between current time and a tariff switch point does not exceed a preset time interval, and that an exception condition of forced offline is not met; and use the transceiver to return, by using the authentication device, a granted service unit determined according to the current available service volume to the access device, and to instruct, by using the authentication device, the access device to perform a forced offline operation when the granted service unit is used up. The exception condition of forced offline is stored in the memory.

Figure 8:
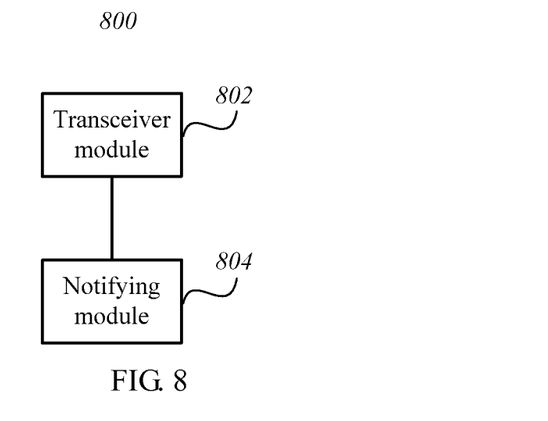
FIG. 8 is a simplified block diagram of an authentication device according to an embodiment of the present application.

FIG. 8 is a schematic diagram of a logical structure of an authentication device 800 according to an embodiment of the present application. As shown in FIG. 8, the authentication device 800 includes a transceiver module 802 and a notifying module 804.

The transceiver module 802 is configured to receive an access request from an access device, and send a service volume request to a charging device, where the service volume request carries a requested service unit.

The notifying module 804 is configured to: when the charging device determines that a current available service volume is smaller than the requested service unit and a time interval between current time and a tariff switch point does not exceed a preset time interval, if an exception condition of forced offline is met, return a granted service unit determined according to the current available service volume to the access device, and instruct the access device to send a service volume request again when the granted service unit is used up.

Specifically, the notifying module 804 is configured to: after receiving a notification sent by the charging device when the charging device determines that a current available service volume is smaller than the requested service unit and a time interval between current time and a tariff switch point does not exceed a preset time interval and if the exception condition of forced offline is met, return a granted service unit determined according to the current available service volume to the access device, and instruct the access device to send a service volume request again when the granted service unit is used up.

Specifically, when returning the granted service unit determined according to the current available service volume to the access device, the notifying module 804 is specifically configured to determine the granted service unit according to the current available service volume and return the granted service unit to the access device.

In a specific implementation process, the exception condition of forced offline may be that the current tariff is higher than the tariff applied after the tariff switch point. For example, the service is charged before the tariff switch point but is free of charge after the tariff switch point, the tariff is zero after the tariff switch point.

On condition that the exception condition of forced offline is that the current tariff is higher than the tariff applied after the tariff switch point (the tariff applied after the tariff switch point may be zero or not), another condition may also be added in the exception condition of forced offline: The current available service volume is not smaller than a preset service volume threshold.

In a specific implementation process, the exception condition of forced offline may also be that the current available service volume is not smaller than a rated service volume determined according to a preset rated access rate and the time interval between the current time and the tariff switch point.

Details about the current available volume, the preset time interval, and the exception condition of forced offline have been given above, which are not repeated here any further.

It should be noted that in a specific implementation process, the authentication device 800 further includes necessary hardware modules such as a transceiver. The operations of the foregoing modules should be understood as operations implemented by the transceiver after corresponding instructions are delivered to the transceiver. The transceiver module 802 is configured to receive an access request from the access device by using the transceiver, and send a service volume request to the charging device by using the transceiver. The notifying module 804 is configured to: after receiving, by using the transceiver, a notification sent by the charging device when the charging device determines that a current available service volume is smaller than the requested service unit and a time interval between current time and a tariff switch point does not exceed a preset time interval and if the exception condition of forced offline is met, return, by using the transceiver, a granted service unit determined according to the current available service volume to the access device, and instruct, by using the transceiver, the access device to send a service volume request again when the granted service unit is used up. Optionally, the authentication device further includes necessary hardware modules such as a processor. The notifying module 804 is specifically configured to determine, by using the processor, a granted service unit according to the current available service volume, and return, by using the transceiver, the granted service unit to the access device.

Figure 9:
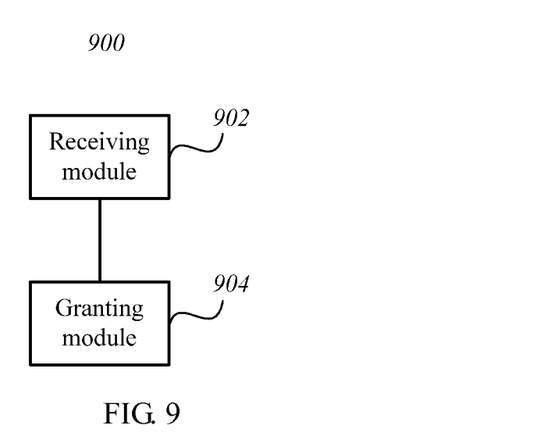
FIG. 9 is a simplified block diagram of a charging device according to an embodiment of the present application.

FIG. 9 is a schematic diagram of a logical structure of a charging device 900 according to an embodiment of the present application. As shown in FIG. 9, the charging device 900 includes a receiving module 902 and a granting module 904.

The receiving module 902 is configured to receive a service volume request from an access request, where the service volume request carries a requested service unit.

The granting module 904 is configured to: when a current available service volume is smaller than the requested service unit and a time interval between current time and a tariff switch point does not exceed a preset time interval, if an exception condition of forced offline is met, return a granted service unit determined according to the current available service volume to the access device, and instruct the access device to send a service volume request again when the granted service unit is used up.

In a specific implementation process, the exception condition of forced offline may be that the current tariff is higher than the tariff applied after the tariff switch point. For example, the service is charged before the tariff switch point but is free of charge after the tariff switch point, the tariff is zero after the tariff switch point.

On condition that the exception condition of forced offline is that the current tariff is higher than the tariff applied after the tariff switch point (the tariff applied after the tariff switch point may be zero or not), another condition may also be added in the exception condition of forced offline: The current available service volume is not smaller than a preset service volume threshold.

In a specific implementation process, the exception condition of forced offline may also be that the current available service volume is not smaller than a rated service volume determined according to a preset rated access rate and the time interval between the current time and the tariff switch point.

Details about the current available volume, the preset time interval, and the exception condition of forced offline have been given above, which are not repeated here any further.

In a specific implementation process, the granting module 904 is further configured to: when the current available service volume is smaller than the requested service unit and a time interval between current time and a tariff switch point does not exceed a preset time interval, if the exception condition of forced offline is not met, return a granted service unit determined according to the current available service volume to the access device by using the authentication device, and instruct, by using the authentication device, the access device to perform a forced offline operation when the granted service unit is used up.

It should be noted that in a specific implementation process, the charging device 900 further includes necessary hardware modules such as a processor and a transceiver. The operations of the foregoing modules should be understood as operations implemented by the processor and/or the transceiver after corresponding instructions are delivered to the processor and/or the transceiver. In addition, the charging device 900 further includes necessary hardware modules such as a memory for storing data. The receiving module 902 is configured to receive a service volume request from the access device by using the transceiver. The granting module 904 is configured to: use the processor to determine that a current available service volume is smaller than the requested service unit, and that a time interval between current time and a tariff switch point does not exceed a preset time interval, and that an exception condition of forced offline is met, and use the transceiver to return a granted service unit determined according to the current available service volume to the access device, and to instruct the access device to send a service volume request again when the granted service unit is used up. The granting module 904 is further configured to: use the processor to determine that a current available service volume is smaller than the requested service unit, and that a time interval between current time and a tariff switch point does not exceed a preset time interval, and that an exception condition of forced offline is not met; and use the transceiver to return, by using the authentication device, a granted service unit determined according to the current available service volume to the access device, and to instruct, by using the authentication device, the access device to perform a forced offline operation when the granted service unit is used up. In addition, the exception condition of forced offline is stored in the memory.

Figure 10:
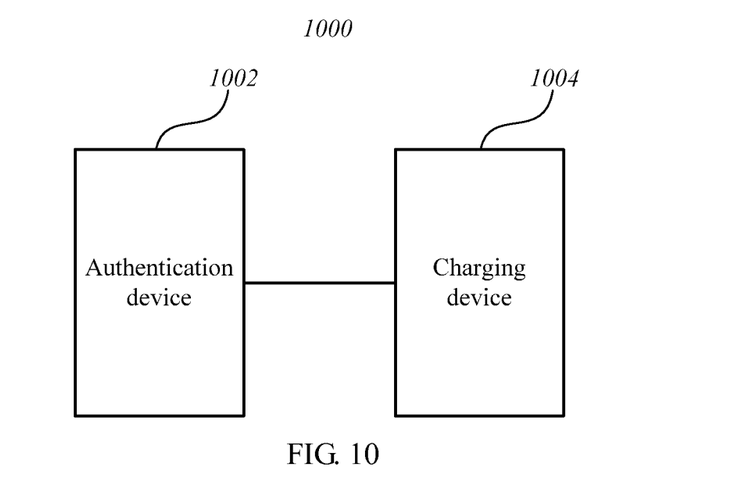
FIG. 10 is a simplified block diagram of a charging system according to an embodiment of the present application.

FIG. 10 is a schematic diagram of a logical structure of a charging system 1000 according to an embodiment of the present application. As shown in FIG. 10, the charging system 1000 includes an authentication device 1002 and a charging device 1004.

The authentication device 1002 is configured to receive an access request from an access device, and send a service volume request, where the service volume request carries a requested service unit.

The charging device 1004 is configured to: receive the service volume request, and when a current available service volume is smaller than the requested service unit and a time interval between current time and a tariff switch point does not exceed a preset time interval, if an exception condition of forced offline is met, instruct the authentication device 1002 to return a granted service unit determined according to the current available service volume to the access device, and instruct, by using the authentication device 1002, the access device to send a service volume request again when the granted service unit is used up.

Specifically, when instructing the authentication device 1002 to return the granted service unit determined according to the current available service volume to the access device, the charging device 1004 is specifically configured to return the current available service volume to the authentication device 1002 so that the authentication device 1002 determines the granted service unit according to the current available service volume and returns the granted service unit to the access device, instruct the authentication device to determine the granted service unit according to the current available service volume and return the granted service unit to the access device.

In a specific implementation process, the exception condition of forced offline may be that the current tariff is higher than the tariff applied after the tariff switch point. For example, the service is charged before the tariff switch point but is free of charge after the tariff switch point, the tariff is zero after the tariff switch point.

On condition that the exception condition of forced offline is that the current tariff is higher than the tariff applied after the tariff switch point (the tariff applied after the tariff switch point may be zero or not), another condition may also be added in the exception condition of forced offline: The current available service volume is not smaller than a preset service volume threshold.

In a specific implementation process, the exception condition of forced offline may also be that the current available service volume is not smaller than a rated service volume determined according to a preset rated access rate and the time interval between the current time and the tariff switch point.

Details about the current available volume, the preset time interval, and the exception condition of forced offline have been given above, which are not repeated here any further.

In a specific implementation process, the charging device 1004 is further configured to: when the current available service volume is smaller than the requested service unit and a time interval between current time and a tariff switch point does not exceed a preset time interval, if the exception condition of forced offline is not met, return a granted service unit determined according to the current available service volume to the access device by using the authentication device 1002, and instruct, by using the authentication device 1002, the access device to perform a forced offline operation when the granted service unit is used up.

A person of ordinary skill in the art should understand that all or a part of the steps of the method in the embodiments may be implemented by a computer program instructing relevant hardware. The program may be stored in a computer readable storage medium such as a read-only memory (ROM), a random access memory (RAM), or an optical disk.

In conclusion, the foregoing descriptions are merely exemplary embodiments of the present application, but are not intended to limit the protection scope of the present application. Any modifications, equivalent substitutions, and improvements made within the spirit and principles of the present application shall fall within the protection scope of the present application.

What is claimed is:

1. A method for providing fee-charging service volumes in a communication network, comprising:
   receiving, by a charging device, a service volume request sent by an authentication device according to an access request from an access device, wherein the service volume request indicates a service unit requested by a user;
   determining, by the charging device based on a current tariff and a remaining balance of an account of the user, a current available service volume of the user;
   determining, by the charging device, a time interval between a current time and a tariff switch point for switching to a different tariff;
   comparing the current available service volume with the service unit requested by the user and comparing the time interval with a preset time interval;
   when the current available service volume is smaller than the service unit requested by the user, the time interval between current time and the tariff switch point does not exceed the preset time interval, and a condition for not forcing the user offline is met, instructing, by the charging device, the authentication device to grant a granted service unit determined according to the current available service volume to the access device; and
   instructing the authentication device to notify the access device to send a second service volume request when the granted service unit is used up.

2. The charging method according to claim 1, further comprising:
   instructing, via the authentication device, the access device to send a service volume request again when the granted service unit is used up.

3. The method according to claim 1, wherein instructing the authentication device to grant a granted service unit determined according to the current available service volume to the access device comprises:

returning the current available service volume to the authentication device, so that the authentication device determines the granted service unit according to the current available service volume and grants the granted service unit to the access device.

4. The method according to claim 1, wherein the condition for not forcing the user offline comprises:
the current tariff is higher than the tariff applied after the tariff switch point.

5. The method according to claim 4, wherein the tariff applied after the tariff switch point is zero.

6. The method according to claim 4, wherein the condition for not forcing the user offline further comprises:
the current available service volume is not smaller than a preset volume threshold.

7. The method according to claim 4, wherein the condition not forcing the user offline further comprises:
the current available service volume is not smaller than a rated service volume determined according to a preset rated access rate and the time interval between the current time and the tariff switch point.

8. A charging device for providing fee-charging service volumes in a communication network, comprising:
a receiving module, configured to receive a service volume request sent by an authentication device according to an access request from an access device, wherein the service volume request indicates a service unit requested by a user; and
a granting module, configured to:
determine, based on a current tariff and a remaining balance of an account of the user, a current available service volume of the user,
determining, by the charging device, a time interval between a current time and a tariff switch point for switching to a different tariff;
comparing the current available service volume with the service unit requested by the user and comparing the time interval with a preset time interval;
when the current available service volume is smaller than the service unit requested by the user, the time interval between current time and the tariff switch point does not exceed a preset time interval, and a condition for not forcing the user offline is met, instruct the authentication device to grant a granted service unit determined according to the current available service volume to the access device; and
instructing the authentication device to notify the access device to send a second service volume request when the granted service unit is used up.

9. The charging device according to claim 8, wherein the granting module is further configured to:
instruct, via the authentication device, the access device to send a service volume request again when the granted service unit is used up.

10. The charging device according to claim 8, wherein when instructing the authentication device to grant the granted service unit determined according to the current available service volume to the access device, the granting module is specifically configured to:
return the current available service volume to the authentication device, so that the authentication device determines the granted service unit according to the current available service volume and grants the granted service unit to the access device.

11. The charging device according to claim 8, wherein the condition for not forcing the user offline comprises:
the current tariff is higher than the tariff applied after the tariff switch point.

12. The charging device according to claim 11, wherein the tariff applied after tariff switch point is zero.

13. The charging device according to claim 11, wherein the condition for not forcing the user offline further comprises:
the current available service volume is not smaller than a preset volume threshold.

* * * * *